US012259645B1

(12) United States Patent
Kelley

(10) Patent No.: US 12,259,645 B1
(45) Date of Patent: Mar. 25, 2025

(54) CAMERA SIGHT SYSTEM AND RELATED METHODS

(71) Applicant: Michael Kelley, Scottsdale, AZ (US)

(72) Inventor: Michael Kelley, Scottsdale, AZ (US)

(73) Assignee: Michael Kelley, Scottsdale, AZ (US)

( * ) Notice: Subject to any disclaimer, the term of this patent is extended or adjusted under 35 U.S.C. 154(b) by 0 days.

(21) Appl. No.: 18/813,440

(22) Filed: Aug. 23, 2024

(51) Int. Cl.
G03B 17/56 (2021.01)
(52) U.S. Cl.
CPC ......... G03B 17/566 (2013.01); G03B 17/565 (2013.01)
(58) Field of Classification Search
CPC ............................ G03B 17/566; G03B 17/565
USPC .................................................. 348/373–375
See application file for complete search history.

(56) References Cited

U.S. PATENT DOCUMENTS

| | | | | |
|---|---|---|---|---|
| 9,866,737 | B2 * | 1/2018 | Uemura | G03B 13/04 |
| 10,101,121 | B2 * | 10/2018 | Cabrera | F41G 1/10 |
| 10,705,355 | B2 * | 7/2020 | Qi | G02F 1/0311 |
| 2013/0008072 | A1 * | 1/2013 | Chung | F41G 1/30 |
| | | | | 42/113 |
| 2015/0215506 | A1 * | 7/2015 | Mochinushi | G03B 15/05 |
| | | | | 348/374 |
| 2016/0223806 | A1 * | 8/2016 | Mochinushi | G03B 13/08 |

FOREIGN PATENT DOCUMENTS

KR          101394326     *  5/2014

OTHER PUBLICATIONS

Fingar, M., "Mounting Red Dots on Cameras," Guns & Ammo, Jul. 20, 2020, pp. 1-16. Retrieved as early as Aug. 20, 2024. https://www.gunsandammo.com/editorial/mounting-red-dots-cameras/380226#replay.

* cited by examiner

*Primary Examiner* — Lin Ye
*Assistant Examiner* — Chan T Nguyen
(74) *Attorney, Agent, or Firm* — IP TechLaw

(57) ABSTRACT

Implementations of red dot brackets may include a platform configured to have a red dot sight adjustably couple thereon and an attachment portion coupled to the platform. The attachment portion may be configured to couple to a camera. The red dot bracket may be configured to hold a red dot sight laterally spaced from a viewfinder of a camera when the red dot bracket is attached to a camera.

20 Claims, 8 Drawing Sheets

CAMERA SIGHT SYSTEM AND RELATED METHODS

BACKGROUND

1. Technical Field

Aspects of this document relate generally to photography, such as camera sight systems for cameras. More specific implementations involve red dot sight systems for cameras.

2. Background

Cameras are instruments used to capture and store images. Cameras include a viewfinder for a user to look through. The viewfinder allows a user to see the image they want to capture with the camera.

SUMMARY

Implementations of red dot brackets may include a platform having a first elongated opening and a second elongated opening. The platform may be configured to hold a red dot sight thereon. Implementations of red dot brackets may include a clamp coupled to the platform. The clamp may include a body having a first channel, a second channel, and a fixed jaw. The clamp may also include a clamp end moveably coupled to the body. The clamp end may include a first projection coupled within the first channel, a second projection coupled within the second channel, and a moveable jaw. The clamp may be configured to directly couple to an L-bracket attached to a camera. The red dot bracket may be configured to hold the red dot sight laterally spaced from a viewfinder of the camera. An amount of lateral spacing between the red dot sight and the viewfinder may be adjustable through the first elongated opening and the second elongated opening.

Implementations of red dot brackets may include one, all, or any of the following:

A mount block slidably coupled to the platform through the first elongated opening and the second elongated opening.

The mount block may include a picatinny rail.

The platform may include a first rail and a second rail. The mount block may be configured to slidably couple within a recess between the first rail and the second rail.

The clamp may include a third channel and the end clamp may include a third projection coupled within the third channel.

The end clamp may include a knob configured to secure or release the clamp from an L-bracket.

The clamp may be orthogonal to the platform.

The red dot bracket may be configured to provide adjustability to the red dot sight coupled on the platform in both a lateral and vertical direction.

The clamp may include an opening extending through a largest side surface of the clamp.

The end clamp may include a first blind opening that receives a first spring and a second blind opening that receives a second spring.

Implementations of red dot brackets may include a platform configured to have a red dot sight adjustably couple thereon and an attachment portion coupled to the platform. The attachment portion may be configured to couple to a camera. The red dot bracket may be configured to hold a red dot sight laterally spaced from a viewfinder of a camera when the red dot bracket is attached to a camera.

Implementations of red dot brackets may include one, all, or any of the following:

The red dot bracket may be configured to allow a user to simultaneously look through the red dot sight with a first eye and through the viewfinder of the camera with a second eye when the red dot bracket is coupled to the red dot sight and the camera.

The attachment portion may include a clamp.

The clamp may be orthogonal to the platform.

Implementations of camera sight systems may include a red dot bracket including a platform having a first elongated opening and a second elongated opening. The platform may be configured to hold a red dot sight thereon. Implementations of the red dot bracket may include a clamp coupled to the platform. The clamp may include a first channel a second channel, a fixed jaw, and a clamp end having a first projection coupled within the first channel, a second projection coupled within the second channel, and a moveable jaw. Implementations of the camera sight system may include an L-bracket coupled between the clamp and a camera and a red dot sight coupled on the platform. The red dot sight may be laterally adjustable on the platform through the first elongated opening and the second elongated opening. The red dot sight may be configured to align with a first eye of a user and a viewfinder of the camera may be configured to simultaneously align with a second eye of a user.

Implementations of camera sight systems may include one, all, or any of the following:

A mount block coupled between the red dot sight and the platform.

The red dot sight may be laterally adjustable and vertically adjustable.

The clamp may include a third channel and the clamp end may include a third projection coupled within the third channel.

The red dot bracket may include a bridge coupling the platform to the clamp.

The clamp may be orthogonal to the platform.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components, assembly procedures or method elements disclosed herein. Many additional components, assembly procedures and/or method elements known in the art consistent with the intended camera sight systems will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such camera sight systems, and implementing components and methods, consistent with the intended operation and methods.

Figure 1:
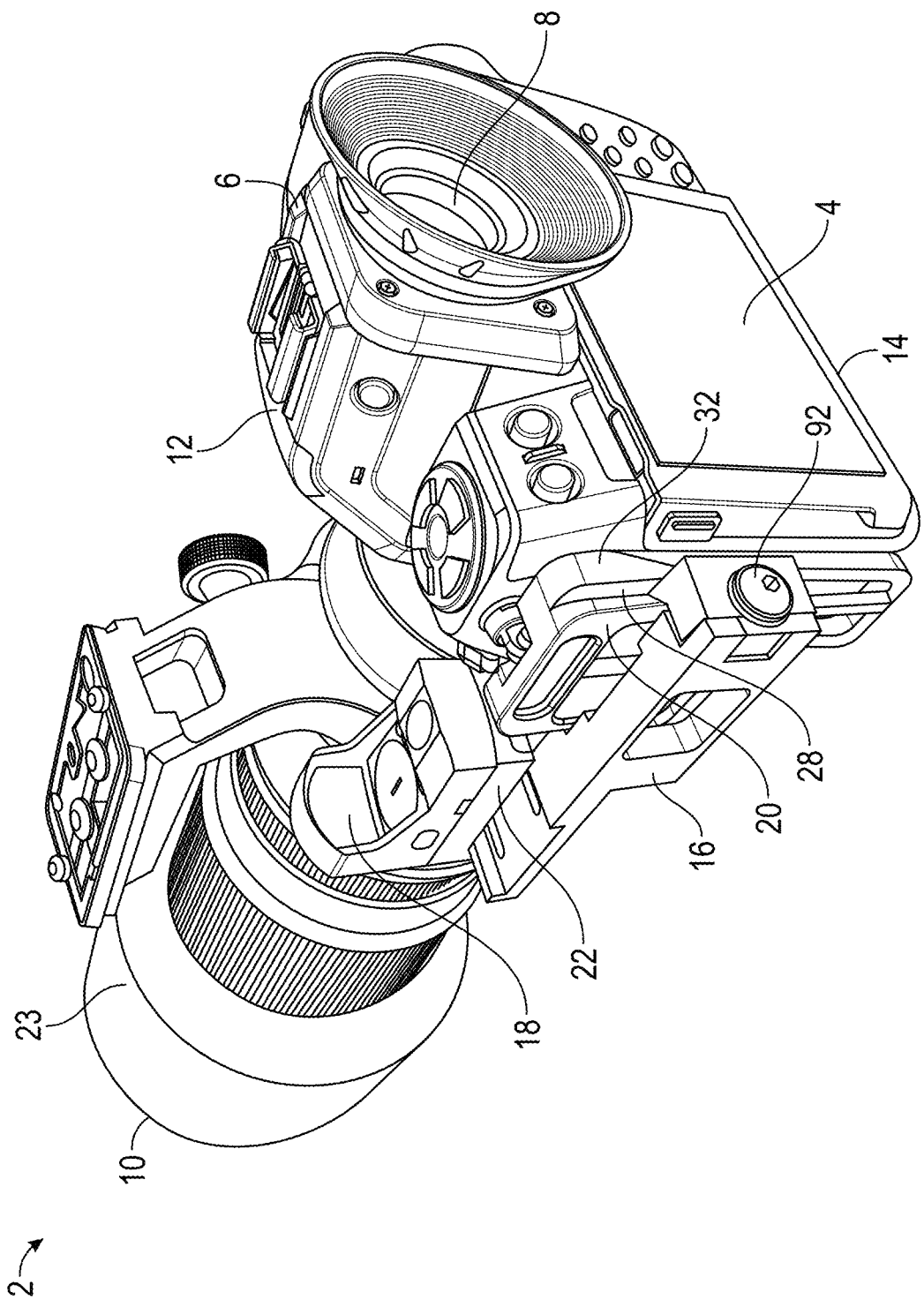
FIG. 1 is a rear perspective view of a camera sight system.
Figure 6:
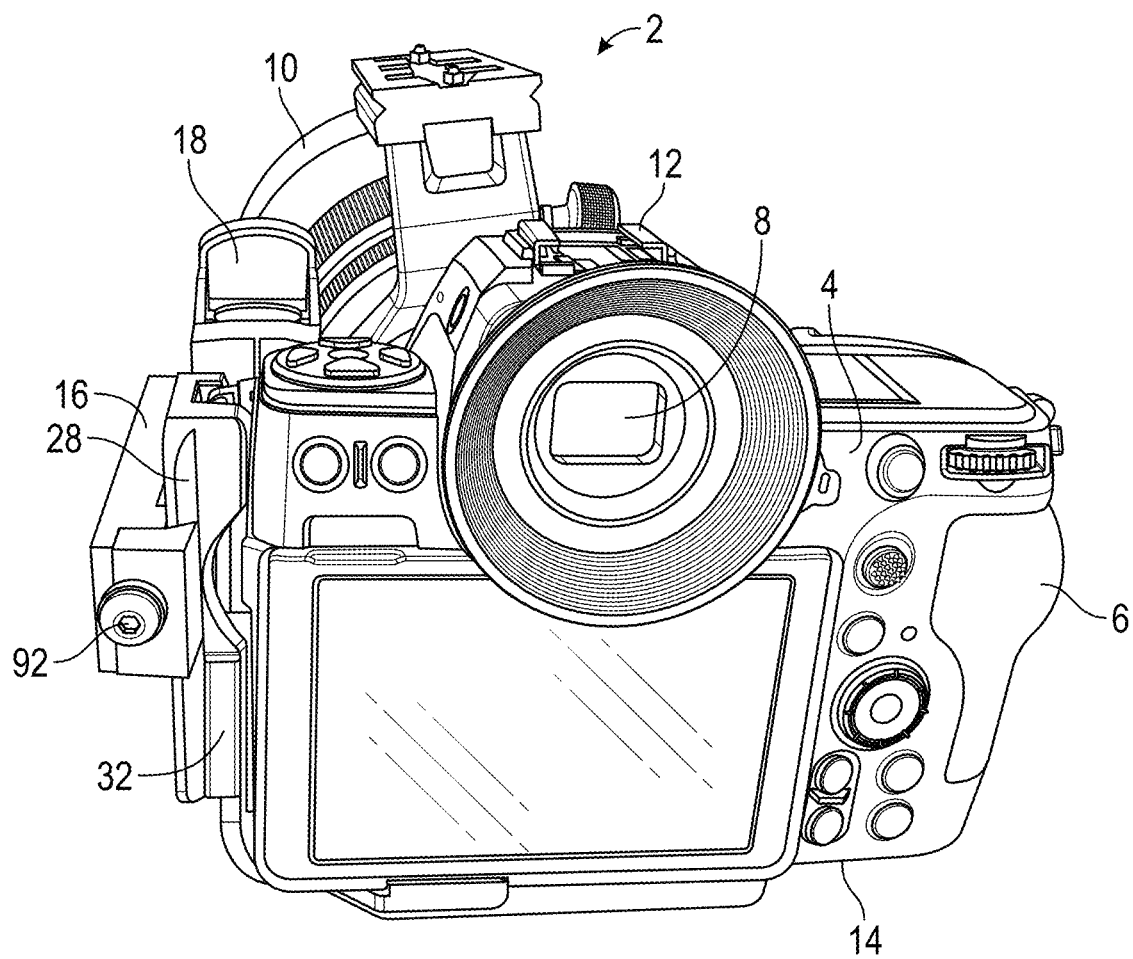
FIG. 6 is a rear view of the camera sight system of FIG. 1.
Figure 8:
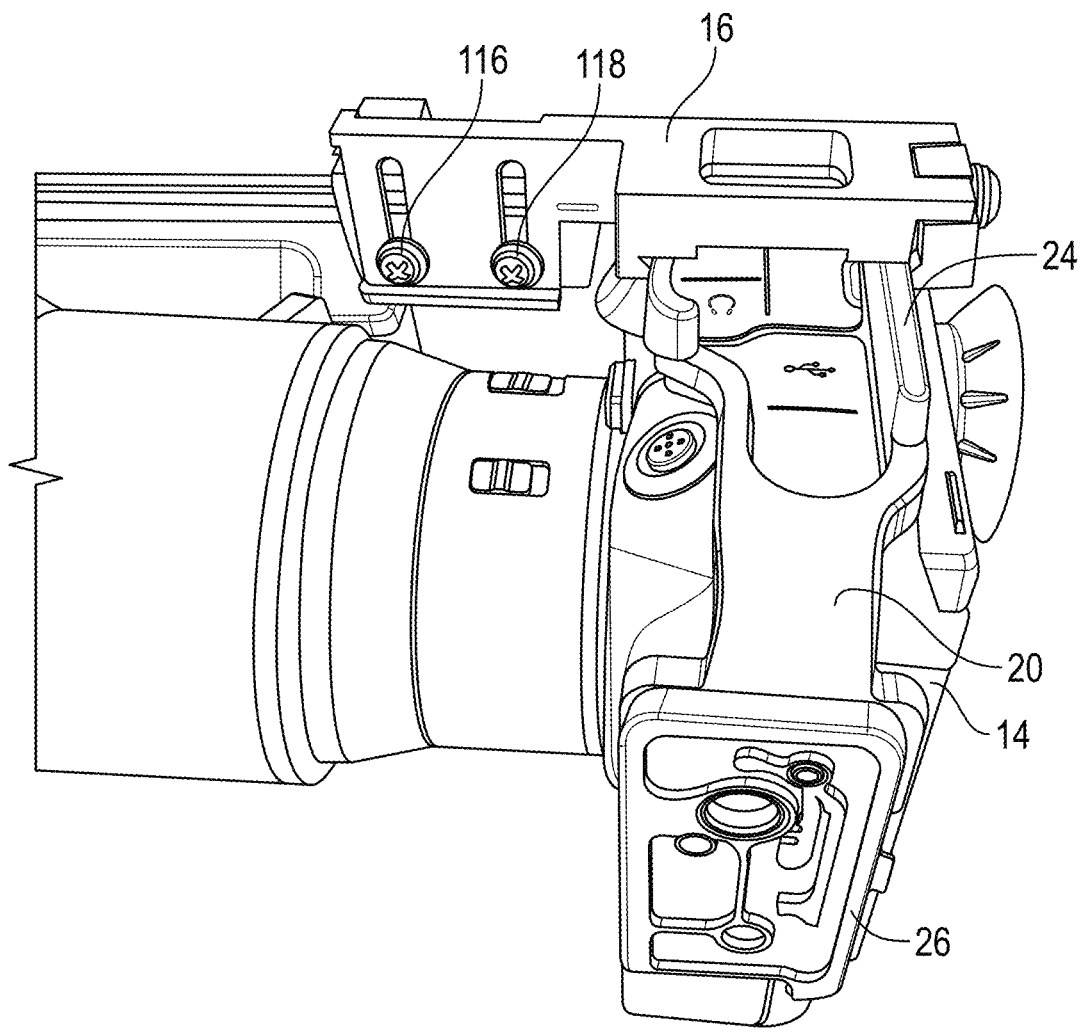
FIG. 8 is a bottom view of the camera sight system of FIG. 1.

Referring to FIG. 1, a rear perspective view of a camera sight system is illustrated. Referring to FIG. 6, a rear view of the camera sight system of FIG. 1 is illustrated. Referring to FIG. 8, a bottom view of the camera sight system of FIG. 1 is illustrated. As used herein, terms of direction and orientation are understood in relation to the orientation of the camera sight system 2 of FIG. 1. More specifically, "rear" refers to the back 4 of the camera 6 through which a photographer may look through a viewfinder 8, "front" refers to the end 10 of the camera opposite the rear, "top" refers to the upper surface 12 of the camera when the camera is situated in an upright orientation, as is illustrated by FIG. 1, "bottom" refers to the base 14 of the camera opposite the top, "vertical" refers to a line or plane between the top of the camera directly over the bottom of the camera, and "lateral" means side-to-side of the camera sight system when viewed from the rear with the camera in an upright position. Accordingly, even if the camera sight system 2 is rotated, it is understood that the terms of orientation defined herein still apply (i.e. if the camera sight system is rotated, the base of the camera is still the side of the camera opposite the top when the camera is situated in an upright orientation as is illustrated by FIG. 1).

The camera sight system 2 includes a camera 6, a red dot bracket 16, and a red dot sight 18. The camera sight system may also include an L-bracket 20 and a mount block 22.

The camera sight system may include any type of camera inasmuch as the camera sight system facilitate the acquisition tracking of a photography subject. In various implementations, the camera may be a digital camera. In particular implementations, the camera 6 may be mirrorless camera.

The camera may include long focal length lenses 23. In such implementations, the camera 6 may include a lens focal length of, by nonlimiting example, 400 mm, 500 mm, 600 mm, or 800 mm. In implementations where focal length lenses are used, the field of view through the viewfinder 8 of the camera 6 may be limited. For example, in implementations where the lens focal length is 400 mm, the vertical field of view may be 3.42 degrees and the horizontal field of view may be 5.14 degrees. In implementations where the lens focal length is 500 mm, the vertical field of view may be 2.74 degrees and the horizontal field of view may be 4.11 degrees. In implementations where the lens focal length is 600 mm, the vertical field of view may be 2.28 degrees and the horizontal field of view may be 3.43 degrees. In implementations where the lens focal length is 800 mm, the vertical field of view may be 1.71 degrees and the horizontal field of view may be 2.57 degrees. The limited field of view may make it difficult to acquire fast-moving or distant photography subjects through the viewfinder 8 of the camera 6.

In various implantations, the camera sight system to may include a teleconverter. In such of implementations, the focal length of the lens may be extended further, resulting in an even smaller vertical and horizontal field of view.

In various implementations, the camera sight system to includes an L-bracket 20. Referring to FIG. 8, the L-bracket includes a side portion 24 configured to directly couple to a side of the camera 6 and a base portion 26 configured to directly coupled to the base 14 of the camera. In various implementations, the side portion 24 may be configured to directly couple to the left side of the camera 6. In other implementations, the side portion 24 may be configured to directly coupled to the right of the camera 6.

Figure 7:
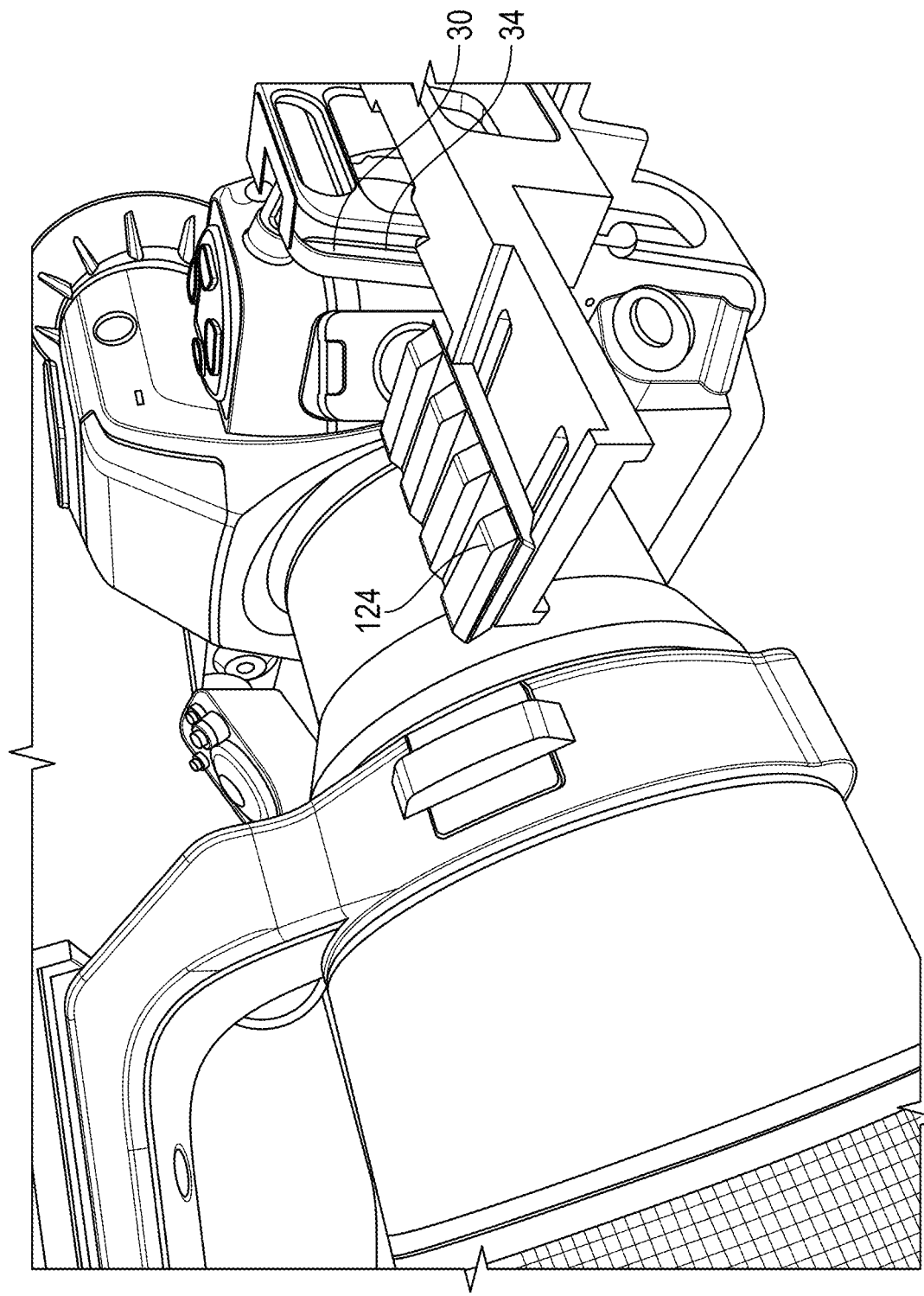
FIG. 7 is a perspective view of the platform of the camera sight system of FIG. 1.

Referring back to FIGS. 1 and 6, the side portion 24 of the L-bracket 20 may include a first groove 28 within a first side 32 of the of the L-bracket and a second groove 30 within a second side 34 of the L-bracket opposing the first side (which second side and second groove are illustrated in FIG. 7). As illustrated by FIG. 1, the first side 32 of the L-bracket 20 faces the rear of the camera sight system 2 and the second side 34 of the L-bracket faces the front of the camera sight system. The first groove 28 of the L-bracket 20 may extend across an entire longest length of first side 32. In other implementations, the first groove 28 may only extend across a portion of the longest length of the first side 32. Similarly, the second groove 30 of the L-bracket 20 may extend across an entire longest length of second side 34. In other implementations, the second groove 30 may only extend across a portion of the longest length of the second side 34.

Still referring to FIGS. 1, 6, and 8, the camera sight system 2 includes a red dot bracket 16. The red dot bracket may be coupled to the camera through the L-bracket. In other implementations, the red dot bracket may be coupled directly to camera and the camera sight system may not include an L-bracket. The red dot bracket 16 is configured to hold a red dot sight 18. While implementations of the camera sight system 2 disclosed herein primarily discuss a red dot bracket that holds a red dot sight, it is understood that the red dot bracket disclosed herein may hold other sights, such as, by non-limiting example, an open sight or a laser.

Figure 2:
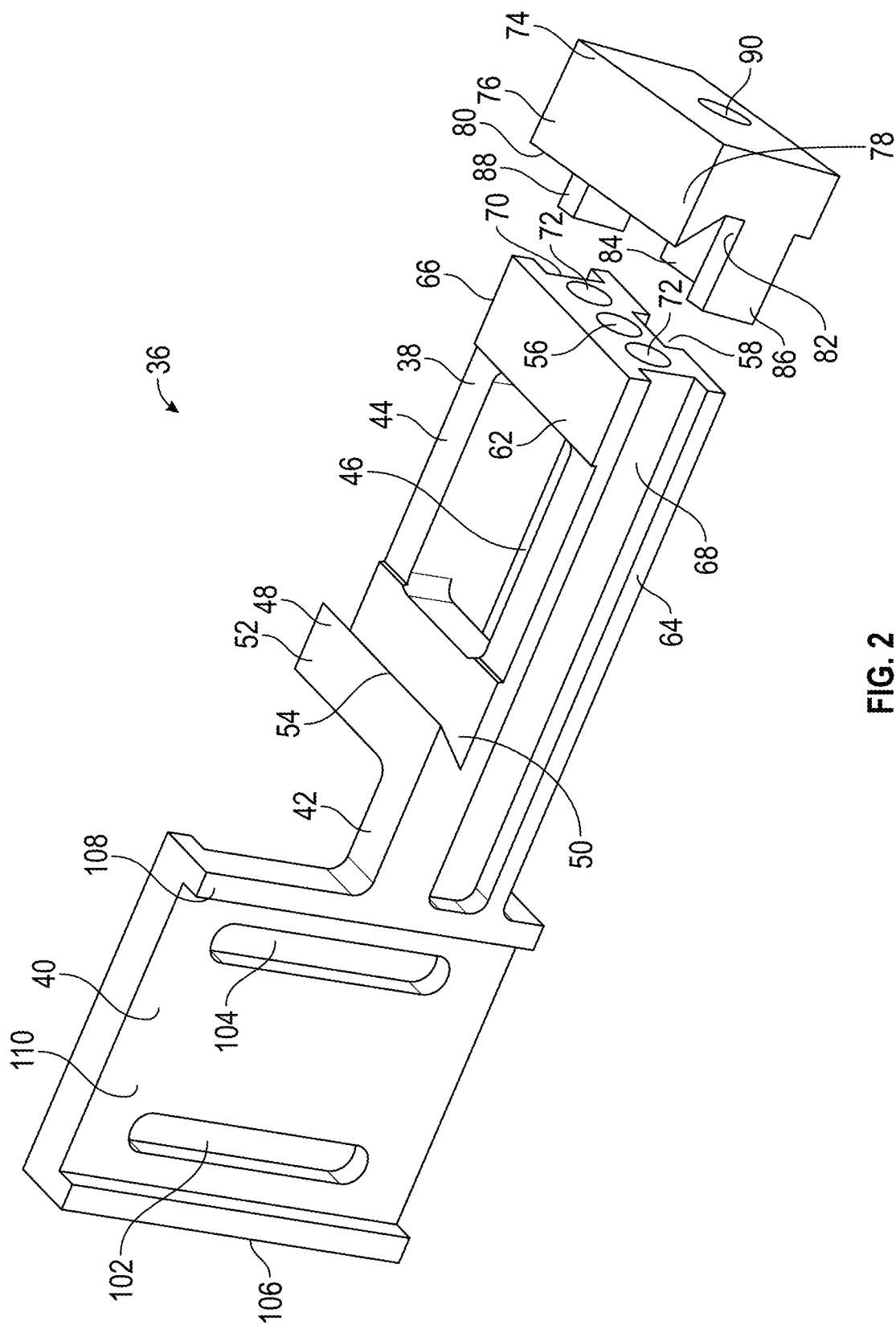
FIG. 2 is an exploded view of a red dot bracket.

Referring to FIG. 2, an exploded view of a red dot bracket is illustrated. The red dot bracket 36 of FIG. 2 may be utilized in place of any other red dot bracket of any camera sight system disclosed herein.

The red dot bracket may be made from, by non-limiting example, a metallic material (such as aluminum), a plastic, a composite (such as carbon fiber), or any other sufficiently rigid material. In various implementations, the red dot bracket may be made from a lightweight material, such as carbon fiber, to minimize the amount of weight added to the camera.

The red dot bracket 36 includes a clamp 38 coupled to a platform 40. The clamp 38 may be coupled to the platform 40 through a bridge 42. In other implementations, the clamp 38 may be directly coupled to the platform 40.

In various implementations, the clamp is configured to directly couple to an L-bracket of a camera sight system. In particular implementations, the clamp may be configured to clamp within a first groove and a second groove of a side portion of an L-bracket. In various implementations, the clamp may be configured to clamp at a variety of heights along the L-bracket. In such implementations, the height of the red dot bracket, and in turn, the height of the red dot sight configured to rest upon the red dot bracket, may be adjusted until the height of the red dot sight is equal to a height of the view finder of the camera.

Figure 3:
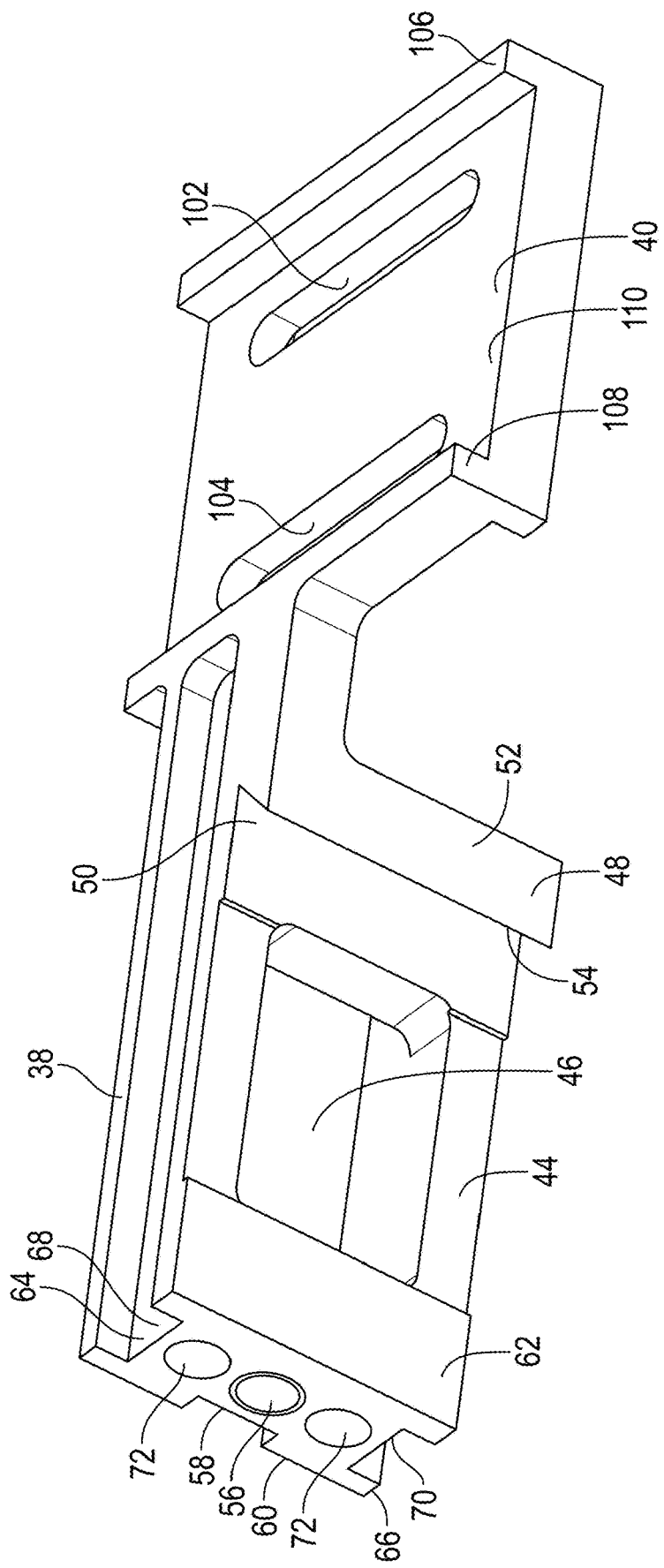
FIG. 3 is a perspective view of a portion of the red dot bracket.

Referring to FIG. 3, a perspective view of a portion of the red dot bracket is illustrated. As illustrated by FIGS. 2-3, the clamp 38 includes a body 44. In various implementations, a plane may exist in a largest perimeter of the body 44. The plane may be aligned within a vertical plane when the clamp is attached to the L-bracket. In various implementations, the body 44 includes an opening 46 formed through the largest side surface of the body. In such implementations, the opening 46 may reduce the weight of the red dot bracket.

The body includes a fixed jaw 48. In particular implementations, the fixed jaw is a projection 52 having a sharp edge 54 formed by an angled recess 50 formed within the projection 52. The fixed jaw 48 may be configured to fit within a second groove of an L-bracket. The fixed jaw 48 may also be configured to attach outside of a groove, or to a flat surface such as a side of an L-bracket not having a groove. While the fixed jaw 48 is illustrated as having the sharp edge 54, in other implementations, the fixed jaw 48 may not include the sharp edge.

In various implementations, the body 44 includes an adjustment opening 56. The adjustment opening may be threaded. The adjustment opening may extend entirely through from the other edge of the body to an inner sidewall of the opening 46 within the body. In other implementations, the adjustment opening 56 may be blind. In implementations of clamps having an adjustment opening 56, the adjustment opening is configured to receive a screw or a threaded rod configured to tighten or loosen the clamp.

In various implementations, the body 44 of the clamp 38 may include a first channel 58 formed within a first surface 60 of the body. The first surface 60 is opposite a second surface 62 configured to directly couple to an L-bracket. The body includes a third surface 64 between the first surface and the second surface and a fourth surface 66 opposite the third surface. In various implementations, the body may include a second channel 68 in the third surface 64. In various implementations, the body may include third channel 70 in the fourth surface 66. While FIGS. 2-3 illustrate the body 44 as including three channels, in other implementations, the body may include any of the first channel 58, the second channel 68, the third channel 70, or any combination thereof. In still other implementations, the body may include a fourth channel formed in the second surface 62.

In various implementations, the body 44 of the clamp 38 may include one or more spring openings 72 adjacent to the adjustment opening 56. In particular implementations, the one or more spring openings 72 may include two openings. The one or more spring openings 72 are blind. The clamp may include one or more springs received by the one or more spring openings 72 in the body 44 of the clamp 38. The one or more springs bias the body 44 of the clamp 38 against the clamp end 74. In such implementations, the clamp is constantly biased towards an open position. Accordingly, if the screw or knob controlling the tightness of the clamp is loosened, then the springs automatically push the clamp into an open position.

Figure 4:
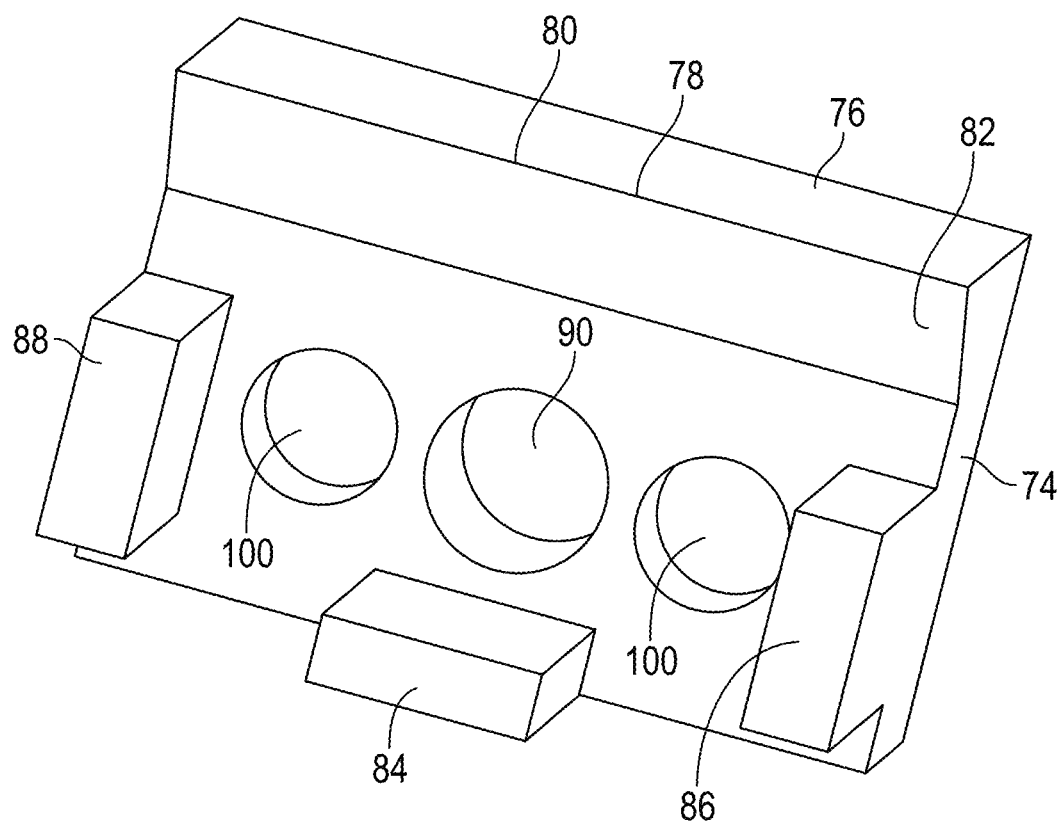
FIG. 4 is a perspective view of a clamp end of the red dot bracket.

The clamp 38 includes a clamp end 74. Referring to FIG. 4, a perspective view of a clamp end of a red dot bracket is illustrated. The clamp end 74 is moveably coupled to the body 44 of the clamp 38. As illustrated by FIGS. 2 and 4, the clamp end 74 includes a moveable jaw 76. The moveable jaw 76 is a projection 78 having a sharp edge 80 formed by an angled recess 82 formed within the projection 78. The moveable jaw 76 may be configured to fit within a first groove of an L-bracket. The moveable jaw 76 may also be configured to attach outside of a groove, or to a flat surface such as a side of an L-bracket not having a groove. While the moveable jaw 76 is illustrated as having the sharp edge 80, in other implementations, the moveable jaw 76 may not include the sharp edge. The moveable jaw 76 may be configured to extend over the body 44 when the clamp end 74 is directly coupled to and flush against the body 44.

In various implementations, the clamp end 74 may include a first projection 84 configured to fit within the first channel 58 of the body 44. In various implementations, the clamp end 74 may include a second projection 86 configured to fit within the second channel 68 of the body 44. In various implementations, the clamp end 74 may include a third projection 88 configured to fit within the third channel 70 of the body 44. The number of projections extending from the clamp end 74 may correspond to the number of channels formed within the body. Thus, while FIGS. 2 and 4 illustrate the clamp end 74 as having three projections, in other implementations, the clamp end may include any of the first projection 84, the second projection 86, the third projection 88, a fourth projection configured to couple within a fourth channel, or any combination thereof.

In implementations having the projections coupled within the channels, movement of the clamp end relative to the body may be controlled and guided by the projections sliding within the channels. In implementations having the second projection 86 slidably coupled within the second channel 68 and/or the third projection 88 slidably coupled within the third channel 70, buckling of the clamp may be prevented when the jaws of the clamp tighten down upon, for example, an L-bracket. Buckling is prevented because the projections lie flush with the sidewalls of the channel. When the clamp tries to buckle, buckling is prevented through the projections engaging with the sidewalls of the channel. When the jaws of the clamp tighten, the clamp may experience a natural tendency to buckle which could result in the second surface 62 of the body 44 not sitting flush against the L-bracket. In such implementations, if the body 44 of the clamp were to not sit flush, it may affect the orientation of the platform, and in turn, the orientation of the red dot sight coupled on the platform. Accordingly, the second projection 86 slidably coupled within the second channel 68 and/or the third projection 88 slidably coupled within the third channel 70 may ensure that the red dot sight is pointed straight forward (parallel to the direction the viewfinder is pointed).

In other implementations, rather than having channels exposed on an outer surface of the body with projections of the clamp end configured to slide within the channels, the body may include openings (similar to the one or more spring openings 72) and the clamp end may include projections configured to slide within the openings. In such implementations, the orientation of the red dot bracket may remain in a desired position as the clamp may be prevented from buckling due to the openings and projections extending within the openings.

Still referring to FIGS. 2 and 4, the clamp end 74 includes an adjustment opening 90. The adjustment opening 90, though not illustrated as such, may be threaded. The adjustment opening 90 is configured to align with the adjustment opening 56 of the body 44 and is also configured to receive the same screw or threaded rod configured to be received by the adjustment opening 56 within the body 44 and configured to tighten or loosen the clamp.

Referring to FIGS. 1 and 6, a head of a screw 92 is illustrated. The screw 92 extends through the adjustment openings of the clamp and secures the clamp to the L-bracket. While the head of the screw 92 is illustrated as directly couple to an outermost surface of the red dot bracket, in other implementations the screw may be reversed and the head of the screw may be configured to directly couple to an inner wall of the opening formed within the body. In such implementations, the adjustment opening of the clamp end may be blind or may extend entirely through the clamp end. In implementations having a screw head, the user may require a screwdriver or wrench to tighten or loosen the clamp.

Figure 9:
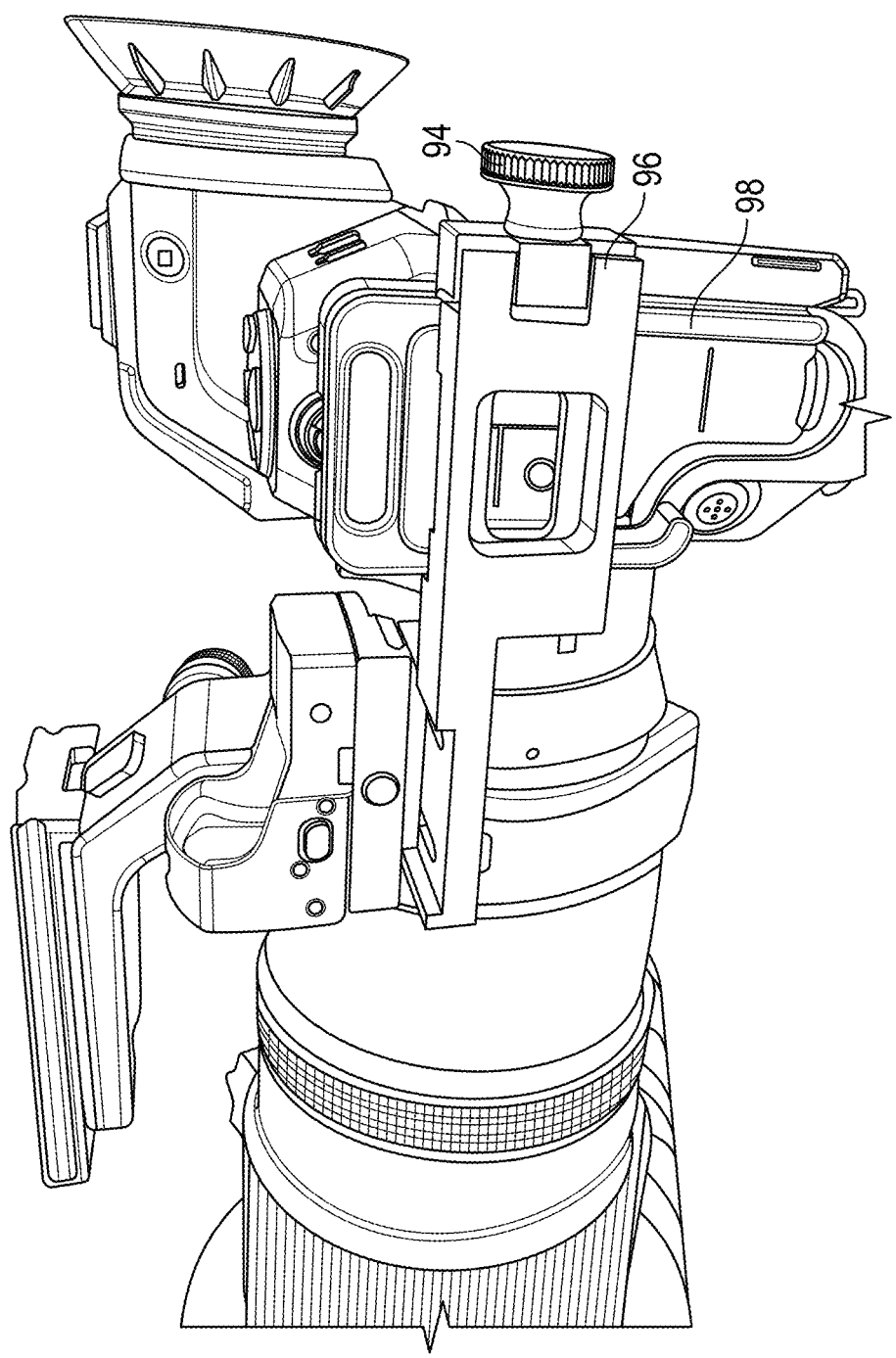
FIG. 9 is a side view of a camera sight system.

Referring to FIG. 9, a side view of a camera sight system is illustrated. Any of the implementations disclosed herein having a clamp may include a knob used to tighten and loosen the clamp. In various implementations, the screw or threaded rod configured to tighten and loosen the clamp may include a knob 94 through which a user may tighten or loosen the clamp by hand, and in turn, remove or attach the red dot bracket 96 to the L-bracket 98. In particular implementations, and referring back to FIG. 2, the adjustment opening 56 in the body 44 may be blind. In such implementations, the threaded rod may be non-rotatably fixed in the adjustment opening and may also extend through the adjustment opening 90 of the clamp end 74. In such implementations, the adjustment opening 90 may not be threaded and may be sufficiently larger than the threaded rod to allow the clamp end 74 to slide along the threaded rod without having to rotate along the threads of the threaded rod. The threaded rod may include a head. A knob may be coupled between the head and the clamp end. The knob may include a threaded opening that threads onto the threaded rod. In such implementations, the knob may move along the threaded rod by rotating. If rotated in one direction, the knob may push down against the clamp end 74 and tighten the clamp. If rotated the other way, the knob may move away from the clamp end 74 and loosen the clamp. The head of the threaded rod may prevent the knob from being removed off of the rod (and in turn, prevents the clamp end from fully separating from the remainder of the red dot bracket).

Referring back to FIG. 4, in various implementations, the clamp end 74 may include one or more spring openings 100 adjacent to the adjustment opening 90. In particular implementations, the one or more spring openings 100 may include two openings. The one or more spring openings 100 are be blind, as illustrated by FIG. 4. The one or more spring openings 100 are configured to each receive a spring that is also received by a corresponding spring opening in the body 44 of the clamp 38.

While the implementations disclosed herein primarily describes a red dot bracket configured to couple to a camera through the attachment portion that includes a clamp, in other implementations the red dot bracket may include an attachment portion having a different attachment mechanism through which the red docket bracket may attach to either an L-bracket or a camera. By non-limiting example, the attachment mechanism may include a threaded rod configured to screw the red dot bracket to either an L-bracket or directly to a camera, a magnet, or any other type of attachment mechanism.

Referring back to FIGS. 2 and 4, the red dot bracket includes a platform 40 configured to hold a red dot sight. In various implementations, and as illustrated by FIG. 2, the platform 40 lies orthogonal to the clamp 38. More specifically, a plane drawn through a largest perimeter of the platform 40 lies orthogonal to a plane drawn through a largest perimeter of the clamp 38.

In various implementations, the platform include a first elongated opening 102 and a second elongated opening 104. The elongated openings may elongate in a lateral direction, or in a direction perpendicular to a direction the camera is pointed when the red dot bracket is attached to a camera. In various implementations, a mount block is configured to attach to the red dot bracket through the first elongated opening 102 and the second elongated opening 104. Because the openings are elongated, the mount block may be configured to attach at different points laterally along the platform. In turn, the red dot sight may be configured to move closer to the camera or further from the camera when the red dot bracket 36 is coupled to a camera. While FIGS. 2 and 4 illustrate two elongated openings, in other implementations the platform may include a single elongated opening.

In other implementations, rather than having two elongated openings the platform may include two rows of openings with each row having a plurality of openings. In particular implementations each row includes four openings, while in other implementations each row may include less than or more than four openings. The two rows of openings may also allow a mount block to attach at different points, or through different openings, laterally along the platform. In turn, the red dot sight may be configured to move closer to the camera or further from the camera when the red dot bracket is coupled to a camera. In still other implementations, the platform may include only a single row of openings.

Still referring to FIGS. 2 and 4, in various implementations the platform 40 includes a first rail 106 and a second rail 108. In such implementations, the platform includes a recess 110 between the two rails. In various implementations, the recess 110 may be configured to receive a mount block (or a portion thereof). In various implementations, the mount block may sit within the recess tight enough that the mount block is unable to rotate within the recess due to the first rail and the second rail. In such implementations, the rails may ensure that the mount block is aligned in a direction that will result in the red dot sight pointing in a direction parallel to the direction the camera is pointing.

Figure 5:
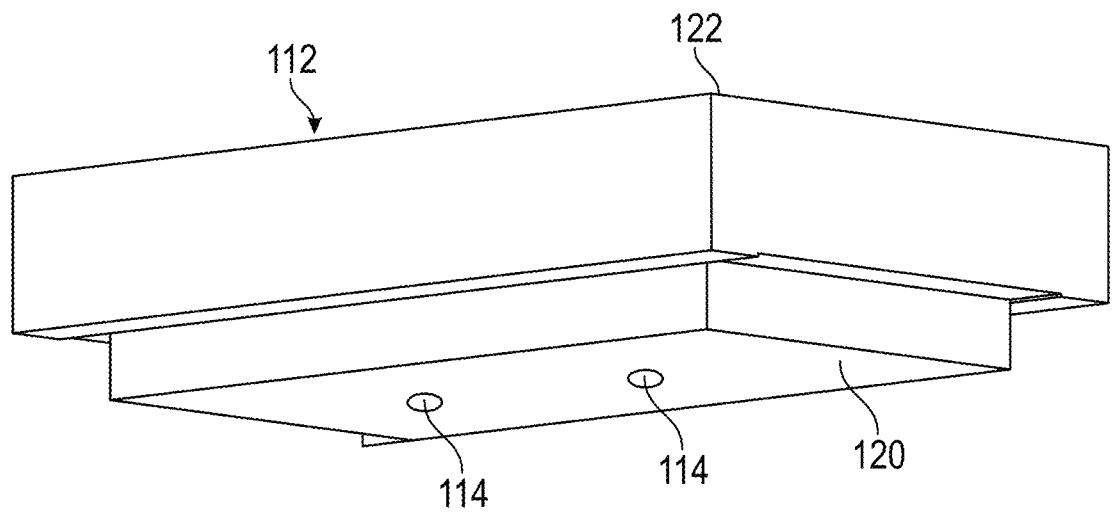
FIG. 5 is a perspective view of a mount block.

In various implementations, the camera sight system includes a mount block. The mount block may be considered part of the red dot bracket or separate from the red dot bracket. Referring to FIG. 5, a perspective view of a mount block is illustrated. The mount block 112 is configured to sit on a platform of a red dot bracket and hold a red dot sight. In various implementations, the red dot bracket may include one or more threaded openings 114. The threaded openings may be configured to receive a screw or threaded rod used to secure the mount block to the platform. Referring to FIG. 8, a first screw 116 and a second screw 118 are illustrated extending through two elongated openings of a platform. These screws extend into threaded openings within a mount block and secure the mount block at a particular location on the platform. In implementations where the platform includes only a single elongated opening or a single row of openings, the mount block may include only a single threaded opening.

While FIG. 8 illustrates the screws as each having a screw head which would require a screw driver or wrench to be used to tighten and loosen the screws (and in turn tighten and loosen the mount block's attachment to the platform), in other implementations the screws or threaded rods may include a knob to allow a user to tighten or loosen the attachment of the mount block by hand.

Referring back to FIG. 2, in various implementations the mount block may include a base 120 having a width less than a widest width of the mount block. In such implementations, the base 120 may be configured to fit within a recess between two rails of a platform. In other implementations, the entire mount block may fit within the recess or the entire mount block may include a width less than a width of the recess.

The mount block may include a red dot sight attachment mechanism coupled to an upper surface 122 of the mount block opposite the base 120. In particular implementations, and as illustrated by FIG. 7, the attachment mechanism may include a picatinny rail 124. In other implementations, the mount block may include other red dot sight attachment mechanisms.

While FIG. 5 illustrates a particular shape and design of a mount block, in other implementations the mount block may include different shapes and designs, including the shape and design of the mount block illustrated by FIG. 7.

While the mount blocks disclosed herein are configured to laterally move along the platform, in other implementations the mount block may be configured to fix to a single location on the platform. In such implementations, the red dot sight may have a fixed lateral position. In other implementations, the red dot sight may be configured to attach to the mount block in various lateral positions, thus allowing for lateral movement of the red dot sight even though the mount block is fixed to a single location along the platform. In still other implementations, the red dot sight may be configured to fix only to a single position relative to the platform, but the platform may be configured to laterally move relative to the clamp, thus allowing from lateral movement of the red dot sight once it is attached to a camera.

The implementations of camera sight systems and red dot brackets disclosed herein allow a red dot sight to attach to a side of a camera in a manner that is sturdy. The implementations disclosed herein minimize the risk of the red dot sight moving from the intended direction it is pointed or from unintentionally becoming unattached from the camera. Because the red dot bracket may adjust vertically relative to the camera, and because the red dot sight is configured to move laterally along the red dot bracket, the red dot sight may be aligned with a photographer's first eye while the viewfinder of the camera is simultaneously aligned with the photographer's second eye when the camera is in an upright position. Accordingly, a lateral width between the viewfinder and the red dot sight may be adjusted to equal a width between a photographer's eyes. This allows for a photographer to use both eyes when acquiring a subject without having to move their eyes between the viewfinder and the red dot sight. The red dot sight attached to the red dot bracket may allow the photographer to acquire the subject quickly and not lose the subject as easily, including subjects that are moving fast or erratically, as is often the case when photographing wildlife. The implementations disclosed herein may be particularly helpful for cameras including long focal length lenses and having autofocus capabilities. In such implementations, the subject can be very difficult to acquire through the viewfinder. Indeed, if the focus is not set to focus at the depth of the subject, it may not even be possible to view the subject through the viewfinder. In such implementations, the photographer may use the red dot sight to acquire the subject and take the photo, at which point the autofocus feature may focus the lens on the subject.

In places where the description above refers to particular implementations of camera sight systems and implementing components, sub-components, methods and sub-methods, it should be readily apparent that a number of modifications may be made without departing from the spirit thereof and that these implementations, implementing components, sub-components, methods and sub-methods may be applied to other camera sight systems.

What is claimed is:

1. A red dot bracket comprising:
a platform comprising a first elongated opening and a second elongated opening, wherein the platform is configured to hold a red dot sight thereon; and
a clamp coupled to the platform, the clamp comprising:
a body comprising a first channel, a second channel, and a fixed jaw; and
a clamp end moveably coupled to the body, the clamp end comprising a first projection coupled within the first channel, a second projection coupled within the second channel, and a moveable jaw;
wherein the clamp is configured to directly couple to an L-bracket attached to a camera;
wherein the red dot bracket is configured to hold the red dot sight laterally spaced from a viewfinder of the camera; and
wherein an amount of lateral spacing between the red dot sight and the viewfinder is adjustable through the first elongated opening and the second elongated opening.

2. The red dot bracket of claim 1, further comprising a mount block slidably coupled to the platform through the first elongated opening and the second elongated opening.

3. The red dot bracket of claim 2, wherein the mount block comprises a picatinny rail.

4. The red dot bracket of claim 2, wherein the platform comprises a first rail and a second rail, wherein the mount block is configured to slidably couple within a recess between the first rail and the second rail.

5. The red dot bracket of claim 1, wherein the clamp further comprises a third channel and the end clamp further comprises a third projection coupled within the third channel.

6. The red dot bracket of claim 1, wherein the end clamp comprises a knob configured to secure or release the clamp from an L-bracket.

7. The red dot bracket of claim 1, wherein the clamp is orthogonal to the platform.

8. The red dot bracket of claim 1, wherein the red dot bracket is configured to provide adjustability to the red dot sight coupled on the platform in both a lateral and vertical direction.

9. The red dot bracket of claim 1, wherein the clamp further comprises an opening extending through a largest side surface of the clamp.

10. The red dot bracket of claim 1, wherein the end clamp further comprises a first blind opening receiving a first spring and a second blind opening receiving a second spring.

11. A red dot bracket comprising:
a platform configured to have a red dot sight laterally adjustably couple thereon; and
an attachment portion coupled to the platform, the attachment portion configured to couple to a camera;
wherein the red dot bracket is configured to hold a red dot sight laterally spaced from a viewfinder of a camera when the red dot bracket is attached to a camera.

12. The red dot bracket of claim 11, wherein the platform comprises a first rail and a second rail parallel to the first rail, wherein the first rail and the second rail are configured to prevent rotation of a mount block coupled between the first rail and the second rail.

13. The red dot bracket of claim 11, wherein the attachment portion comprises a clamp.

14. The red dot bracket of claim 13, wherein the clamp is orthogonal to the platform.

15. A camera sight system comprising:
a red dot bracket comprising:
- a platform comprising a first elongated opening and a second elongated opening, wherein the platform is configured to hold a red dot sight thereon; and
- a clamp coupled to the platform, the clamp comprising:
  - a first channel;
  - a second channel;
  - a fixed jaw; and
  - a clamp end comprising a first projection coupled within the first channel, a second projection coupled within the second channel, and a moveable jaw;

an L-bracket coupled between the clamp and a camera; and a red dot sight coupled on the platform;

wherein the red dot sight is laterally adjustable on the platform through the first elongated opening and the second elongated opening; and wherein the red dot sight is configured to align with a first eye of a user and a viewfinder of the camera is configured to simultaneously align with a second eye of a user.

16. The camera sight system of claim 15, further comprising a mount block coupled between the red dot sight and the platform.

17. The camera sight system of claim 15, wherein the red dot sight is laterally adjustable and vertically adjustable.

18. The camera sight system of claim 15, wherein the clamp further comprises a third channel and the clamp end further comprises a third projection coupled within the third channel.

19. The camera sight system of claim 15, wherein the red dot bracket further comprises a bridge coupling the platform to the clamp.

20. The camera sight system of claim 15, wherein the clamp is orthogonal to the platform.

* * * * *